US009875650B2

(12) United States Patent
Witkowski et al.

(10) Patent No.: US 9,875,650 B2
(45) Date of Patent: Jan. 23, 2018

(54) TRAINABLE TRANSCEIVER AND MOBILE COMMUNICATIONS DEVICE DIAGNOSTIC SYSTEMS AND METHODS

(71) Applicant: GENTEX CORPORATION, Zeeland, MI (US)

(72) Inventors: Todd R. Witkowski, Zeeland, MI (US); Steven L. Geerlings, Holland, MI (US); Thomas S. Wright, Holland, MI (US); Marc A. Smeyers, Zeeland, MI (US); Jonathan E. Dorst, Holland, MI (US); Douglas C. Papay, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 99 days.

(21) Appl. No.: 14/688,959

(22) Filed: Apr. 16, 2015

(65) Prior Publication Data

US 2015/0302733 A1 Oct. 22, 2015

Related U.S. Application Data

(60) Provisional application No. 61/981,497, filed on Apr. 18, 2014.

(51) Int. Cl.

| | |
|---|---|
| ***G05B 19/00*** | (2006.01) |
| ***G08C 17/02*** | (2006.01) |
| *G07C 9/00* | (2006.01) |

(52) U.S. Cl.

CPC ... *G08C 17/02* (2013.01); *G07C 2009/00928* (2013.01); *G08C 2201/20* (2013.01); *G08C 2201/21* (2013.01)

(58) Field of Classification Search

CPC ................ G08C 17/02; G08C 2201/20; G07C 2009/00928

See application file for complete search history.

(56) References Cited

U.S. PATENT DOCUMENTS 5,479,155 A 12/1995 Zeinstra et al.
5,614,891 A 3/1997 Zeinstra et al.
(Continued)

FOREIGN PATENT DOCUMENTS

DE 1020100 15 104 A1 10/2011

OTHER PUBLICATIONS

International Search Report and Written Opinion of the International Searching Authority in PCT/US2015/015262 dated Jul. 2, 2015, 10 pages.

(Continued)

*Primary Examiner* — Joseph Feild
*Assistant Examiner* — Rufus Point
(74) *Attorney, Agent, or Firm* — Foley & Lardner LLP; Bradley D. Johnson

(57) ABSTRACT

A trainable transceiver for installation in a vehicle and for controlling a remote device includes a transceiver circuit configured based on training information to communicate with the remote device, a communications device configured to communicate with a mobile communications device, and a control circuit coupled to the transceiver circuit, and coupled to the communications device. The control circuit is configured to transmit diagnostic information related to the trainable transceiver to a mobile communications device via the communications device.

16 Claims, 8 Drawing Sheets

(56) References Cited

U.S. PATENT DOCUMENTS

| | | | | |
|---|---|---|---|---|
| 6,437,692 | B1 * | 8/2002 | Petite | G01D 4/004 340/3.1 |
| 7,068,181 | B2 * | 6/2006 | Chuey | G08C 17/02 340/12.5 |
| 7,084,781 | B2 * | 8/2006 | Chuey | G08C 17/02 340/12.23 |
| 7,088,218 | B2 * | 8/2006 | Chuey | G07C 9/00309 340/12.5 |
| 7,116,242 | B2 * | 10/2006 | Guthrie | G08C 17/02 340/12.28 |
| 7,183,940 | B2 * | 2/2007 | Chuey | G08C 17/02 340/12.23 |
| 7,183,941 | B2 * | 2/2007 | Chuey | G08C 17/02 307/10.1 |
| 7,627,406 | B2 * | 12/2009 | Wang | G01M 17/00 340/539.24 |
| 7,786,843 | B2 * | 8/2010 | Witkowski | G08C 19/28 340/12.23 |
| 7,864,070 | B2 * | 1/2011 | Witkowski | G08C 19/28 340/12.24 |
| 7,970,446 | B2 * | 6/2011 | Witkowski | G07C 5/008 340/13.21 |
| 8,049,595 | B2 * | 11/2011 | Olson | G08C 17/02 340/4.42 |
| 8,111,133 | B2 * | 2/2012 | Rodriguez | G07C 9/00182 340/5.7 |
| 8,174,357 | B2 * | 5/2012 | Geerlings | G08C 17/02 340/12.28 |
| 8,253,528 | B2 * | 8/2012 | Blaker | B60R 25/24 340/5.22 |
| 8,264,333 | B2 * | 9/2012 | Blaker | B60R 25/24 340/12.22 |
| 8,306,521 | B2 * | 11/2012 | Ban | G06F 21/572 455/418 |
| 8,346,432 | B2 * | 1/2013 | Van Wiemeersch | G08C 17/02 340/426.13 |
| 8,478,482 | B2 * | 7/2013 | Tan | H04M 1/6091 455/41.2 |
| 9,007,168 | B2 * | 4/2015 | Bos | G08C 17/02 340/4.3 |
| 9,105,182 | B2 * | 8/2015 | Tomita | G08C 23/04 |
| 9,373,208 | B2 * | 6/2016 | Candelore | G07C 9/00182 |
| 9,449,449 | B2 * | 9/2016 | Evans | H04L 63/102 |
| 2002/0019712 | A1 * | 2/2002 | Petite | G01D 4/004 702/61 |
| 2003/0193390 | A1 * | 10/2003 | Muramatsu | B60R 25/04 340/426.13 |
| 2003/0228879 | A1 * | 12/2003 | Witkowski | G07C 5/008 455/550.1 |
| 2004/0110472 | A1 * | 6/2004 | Witkowski | G07C 5/008 455/41.2 |
| 2004/0203379 | A1 * | 10/2004 | Witkowski | H04L 12/66 455/41.2 |
| 2005/0024230 | A1 * | 2/2005 | Chuey | G08C 17/02 340/12.23 |
| 2006/0155437 | A1 * | 7/2006 | Wang | G01M 17/00 701/32.7 |
| 2006/0158344 | A1 * | 7/2006 | Bambini | G05B 19/0426 340/12.22 |
| 2006/0214813 | A1 * | 9/2006 | Witkowski | G08C 19/28 340/12.22 |
| 2006/0220806 | A1 * | 10/2006 | Nguyen | B60R 25/102 340/426.36 |
| 2007/0060056 | A1 * | 3/2007 | Whitaker | H04M 1/72533 455/41.2 |
| 2007/0208521 | A1 * | 9/2007 | Petite | G08C 17/02 702/62 |
| 2007/0299577 | A1 * | 12/2007 | Hattori | G07C 9/00309 701/29.6 |
| 2008/0280602 | A1 * | 11/2008 | Ban | G06F 21/572 455/420 |
| 2008/0291047 | A1 | 11/2008 | Summerford et al. | |
| 2010/0134240 | A1 * | 6/2010 | Sims | G08C 17/02 340/5.1 |
| 2012/0252475 | A1 * | 10/2012 | Farrell | G08G 1/205 455/450 |
| 2012/0274455 | A1 * | 11/2012 | Pilat | G08C 17/02 340/13.21 |
| 2013/0137372 | A1 * | 5/2013 | Nishidai | H04B 5/00 455/41.1 |
| 2013/0147616 | A1 * | 6/2013 | Lambert | G07C 5/008 340/426.1 |
| 2014/0266573 | A1 * | 9/2014 | Sullivan | G07C 9/00571 340/4.32 |
| 2014/0361866 | A1 * | 12/2014 | Evans | H04L 63/102 340/4.32 |
| 2015/0009021 | A1 * | 1/2015 | Witkowski | G08C 17/02 340/12.28 |
| 2015/0134428 | A1 * | 5/2015 | Li | G06Q 20/327 705/13 |
| 2015/0228139 | A1 * | 8/2015 | Geerlings | G08C 17/02 340/5.61 |
| 2015/0302732 | A1 * | 10/2015 | Wright | G08C 17/02 340/5.25 |
| 2015/0302733 | A1 * | 10/2015 | Witkowski | G08C 17/02 340/5.25 |
| 2015/0302734 | A1 * | 10/2015 | Geerlings | G08C 19/28 340/5.25 |
| 2015/0302737 | A1 * | 10/2015 | Geerlings | G08C 17/02 340/5.25 |
| 2015/0302738 | A1 * | 10/2015 | Geerlings | G08C 17/02 340/5.25 |
| 2015/0364033 | A1 * | 12/2015 | Witkowski | G08C 17/02 340/5.25 |

OTHER PUBLICATIONS

International Preliminary Report on Patentability and Transmittal dated Dec. 1, 2016, in corresponding International Application No. PCT/US2015/026253, 8 pages.

International Search Report and Written Opinion of the International Searching Authority dated Nov. 17, 2016, in corresponding PCT Application No. PCT/US2015/026253, 9 pages.

* cited by examiner

TRAINABLE TRANSCEIVER AND MOBILE COMMUNICATIONS DEVICE DIAGNOSTIC SYSTEMS AND METHODS

CROSS-REFERENCE TO RELATED APPLICATIONS

This application claims the benefit of U.S. Provisional Application No. 61/981,497, filed Apr. 18, 2014, which is hereby incorporated by reference in its entirety.

BACKGROUND OF THE INVENTION

The present invention relates generally to the field of trainable transceivers for inclusion within a vehicle. A trainable transceiver generally sends and/or receives wireless signals using a transmitter, receiver, and/or transceiver. The wireless signals may be used to control other devices. For example, a trainable transceiver may send a wireless control signal to operate a garage door opener. A trainable transceiver may be trained to operate with a particular device. Training may include providing the trainable transceiver with control information for use in generating a control signal. A trainable transceiver may be incorporated in a vehicle (integrally or contained within the vehicle) and used to control devices outside the vehicle. It is challenging an difficult to develop trainable transceivers which are easy to train to operate a variety of devices. It is further challenging and difficult to develop a trainable transceiver which provides diagnostic information to a user or another device.

SUMMARY OF THE INVENTION

One embodiments relates to a trainable transceiver for installation in a vehicle and for controlling a remote device includes a transceiver circuit configured based on training information to communicate with the remote device, a communications device configured to communicate with a mobile communications device, and a control circuit coupled to the transceiver circuit, and coupled to the communications device. The control circuit is configured to transmit diagnostic information related to the trainable transceiver to a mobile communications device via the communications device.

Another embodiment relates to a system for providing diagnostic information from a trainable transceiver for controlling a remote device including a trainable for installation in a vehicle and a mobile communications device. The trainable transceiver includes a transceiver circuit configured based on training information to communicate with the remote device, a first radio frequency transceiver, and a control circuit coupled to the transceiver circuit and coupled to the radio frequency transceiver. The control circuit is configured to receive or generate the diagnostic information, and the control circuit is configured to transmit the diagnostic via the first radio frequency transceiver. The mobile communications device includes a second radio frequency transceiver configured to receive a transmission from the first radio frequency transceiver including the diagnostic information, a cellular transceiver, and a processing circuit coupled to the second radio frequency transceiver and coupled to the cellular transceiver. The processing circuit is configured to transmit the diagnostic information to a service provider via the cellular transceiver.

Another embodiment relates to a system for providing diagnostic information from a trainable transceiver for controlling a remote device including a vehicle electronics system and a trainable transceiver for instillation in a vehicle. The vehicle electronics system includes an electronics control unit, and a cellular transceiver. The electronics control unit is configured to control the cellular transceiver. The trainable transceiver for installation in a vehicle includes a transceiver circuit configured based on training information to communicate with the remote device, and a control circuit coupled to the transceiver circuit and coupled to the vehicle electronics system. The control circuit is configured to transmit diagnostic information to a service provider via the cellular transceiver of the vehicle electronics system.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
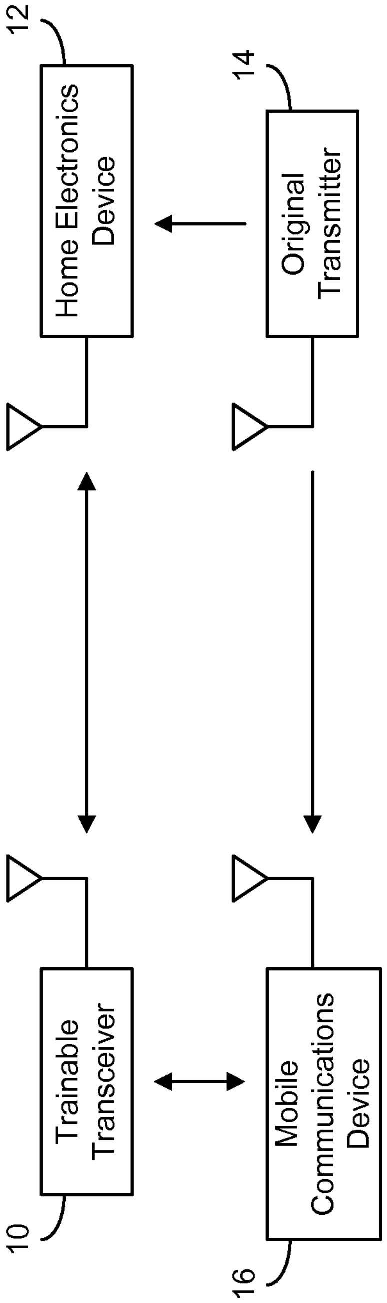
FIG. 1 illustrates communication between a trainable transceiver, mobile electronics device, home electronics device, and original transmitter according to an exemplary embodiment.

Generally, a trainable transceiver controls one or more home electronic devices and/or remote devices. For example, the trainable transceiver may be a Homelink™ trainable transceiver. Home electronic devices may include devices such as a garage door opener, gate opener, lights, security system, and/or other device which is configured to receive activation signals and/or control signals. A home electronic device need not be associated with a residence but can also include devices associated with businesses, government buildings or locations, or other fixed locations. Remote devices may include mobile computing devices such as mobile phones, smartphones, tablets, laptops, computing hardware in other vehicles, and/or other devices configured to receive activation signals and/or control signals.

Activation signals may be wired or, preferably, wireless signals transmitted to a home electronic device and/or remote device. Activation signals may include control signals, control data, encryption information (e.g., a rolling code, rolling code seed, look-a-head codes, secret key, fixed code, or other information related to an encryption technique), or other information transmitted to a home electronic device and/or remote device. Activation signals may have parameters such as frequency or frequencies of transmission (e.g., channels), encryption information (e.g., a rolling code, fixed code, or other information related to an encryption technique), identification information (e.g., a serial number, make, model or other information identifying a home electronic device, remote device, and/or other device), and/or other information related to formatting an activation signal to control a particular home electronic device and/or remote device.

In some embodiments, the trainable transceiver receives information from one or more home electronic devices and/or remote devices. The trainable transceiver may receive information using the same transceiver user to send activation signals and/or other information to home electronic devices and/or remote devices. The same wireless transmission scheme, protocol, and/or hardware may be used from transmitting and receiving. The trainable transceiver may have two way communication with home electronic devices and/or remote devices. In other embodiments, the trainable transceiver includes additional hardware for two way communication with devices and/or receiving information from devices. In some embodiments, the trainable transceiver has only one way communication with a home electronic device and/or remote device (e.g., sending activation signals to the device). The trainable transceiver may receive information about the home electronic device and/or remote device using additional hardware. The information about the home electronic device and/or remote device may be received from an intermediary device such as an additional remote device and/or mobile communication device.

A trainable transceiver may also receive information from and/or transmit information to other devices configured to communicate with the trainable transceiver. For example, a trainable transceiver may receive information for cameras (e.g., imaging information may be received) and/or other sensors. The cameras and/or other sensors may communicate with a trainable transceiver wirelessly (e.g., using one or more transceivers) or through a wired connection. In some embodiments, a trainable transceiver may communicate with mobile communications devices (e.g., cell phones, tablets, smartphones, or other communication devices). In some embodiments, mobile communications devices may include other mobile electronics devices such as laptops, personal computers, and/or other devices. In still further embodiments, the trainable transceiver is configured to communicate with networking equipment such as routers, servers, switches, and/or other hardware for enabling network communication. The network may be the internet and/or a cloud architecture.

In some embodiments, the trainable transceiver transmits and/or receives information (e.g., activation signals, control signals, control data, status information, or other information) using a radio frequency signal. For example, the transceiver may transmit and/or receive radio frequency signals in the ultra-high frequency range, typically between 260 and 960 megahertz (MHz) although other frequencies may be used. In other embodiments, a trainable transceiver may include additional hardware for transmitting and/or receiving signals (e.g., activation signals and/or signals for transmitting and/or receiving other information). For example, a trainable transceiver may include a light sensor and/or light emitting element, a microphone and/or speaker, a cellular transceiver, an infrared transceiver, or other communication device.

A trainable transceiver may be configured (e.g., trained) to send activation signals and/or other information to a particular device and/or receive control signals and/or information from a particular device. The trainable transceiver may be trained by a user to work with particular remote devices and/or home electronic devices (e.g., a garage door opener). For example, a user may manually input control information into the trainable transceiver to configure the trainable transceiver to control the device. A trainable transceiver may also learn control information from an original transmitter. A trainable transceiver may receive a signal containing control information from an original transmitter (e.g., a remote sold with a home electronic device) and determine control information from the received signal. Training information (e.g., activation signal frequency, device identification information, encryption information, modulation scheme used by the device, or other information related to controlling a device via an activation signal) may also be received by a trainable transceiver from a remote device, mobile communications device, or other source.

A trainable transceiver may be mounted or otherwise attached to a vehicle in a variety of locations. For example, a trainable transceiver may be integrated into a dashboard or center stack (e.g., infotainment center) of a vehicle. The trainable transceiver may be integrated into the vehicle by a vehicle manufacturer. A trainable transceiver may be located in other peripheral locations. For example, a trainable transceiver may be removably mounted to a visor. The trainable transceiver may include mounting hardware such as a clip. A trainable transceiver may be mounted to other surfaces of a vehicle (e.g., dashboard, windshield, door panel, or other vehicle component). For example, a trainable transceiver may be secured with adhesive. In some embodiments, a trainable transceiver is integrated in a rear view mirror of the vehicle. A vehicle manufacturer may include a trainable transceiver in the rear view mirror.

In other embodiments, a vehicle may be retrofit to include a trainable transceiver. This may include attaching a trainable transceiver to a vehicle surface using a clip, adhesive, or other mounting hardware as described above. Alternatively, it may include replacing a vehicle component with one that includes an integrated trainable transceiver and/or installing a vehicle component which includes an integrated trainable transceiver. For example, an aftermarket rear view mirror, vehicle camera system (e.g., one or more cameras and one or more display screens), and/or infotainment center may include an integrated trainable transceiver. In further embodiments, one or more components of a trainable transceiver may be distributed within the vehicle.

Referring now to FIG. 1, a trainable transceiver 10 may communicate with a home electronics device 12. In some embodiments, the trainable transceiver 10 and home electronics device 12 communicate using two way communication. For example, the trainable transceiver 10 may transmit activation signals, control signals, requests for information, data and/or other information to the home electronics device 12. The home electronics device 12 may transmit, status information, responses to requests for information, data, requests for information, and/or other information to the trainable transceiver 10. The same and/or similar two way communication may be made between the trainable transceiver 10 and a remote device. In other embodiments, there is only one way communication between the trainable transceiver 10 and the home electronics device 12 and/or remote device. For example, the trainable transceiver 10 transmits activation signals, control signals, data, and/or other information to the home electronics device 12 and/or remote device, and the trainable transceiver 10 does not receive transmissions from the home electronics device 12 or remote device.

In some embodiments, an original transmitter 14 may communicate with the home electronics device 12 and/or remote device. In one embodiment, the original transmitter 14 communicates with the home electronics device 12 and/or remote device using one way communication. For example, the original transmitter 14 may transmit an activation signal to the home electronics device 12 and/or remote device. In some embodiments, the original transmitter 14 may be the source of an activation signal, activation signal parameters, and/or other information related to controlling the home electronics device 12 and/or remote device. This information may be received by a mobile communications device 16 as discussed in greater detail herein. In alternative embodiments, the original transmitter 14 is capable of two way communication. In some embodiments, the trainable transceiver 10 may be configured to receive an activation signal and/or other information from the original transmitter 14.

In one embodiment, the trainable transceiver 10 is capable of two way communication with the mobile communications device 16. For example, a smartphone may be paired with the trainable transceiver 10 such that the trainable transceiver 10 and smartphone communicate using wireless transceivers (e.g., using radio frequency transceivers and/or a protocol such as Bluetooth communication). The trainable transceiver 10 and mobile communications device 16 may exchange information such as status, notifications, activation signals, training information, activation signal parameters, device identification information (e.g., the serial number, make, and/or model of the home electronics device 12), and/or other information.

In some embodiments, the communication described herein with respect to FIG. 1 is wireless communication. In other embodiments, communication may be wired communication. For example, communication between two or more devices may use a wireless network, wireless transceiver, and/or wireless communication protocol (e.g., WiFi, Zigbee, Bluetooth, cellular, etc.), a wired interface and/or protocol (e.g., Ethernet, universal serial bus (USB), Firewire, etc.), or other communications connection (e.g. infrared, optical, ultrasound, etc.).

Figure 2A:
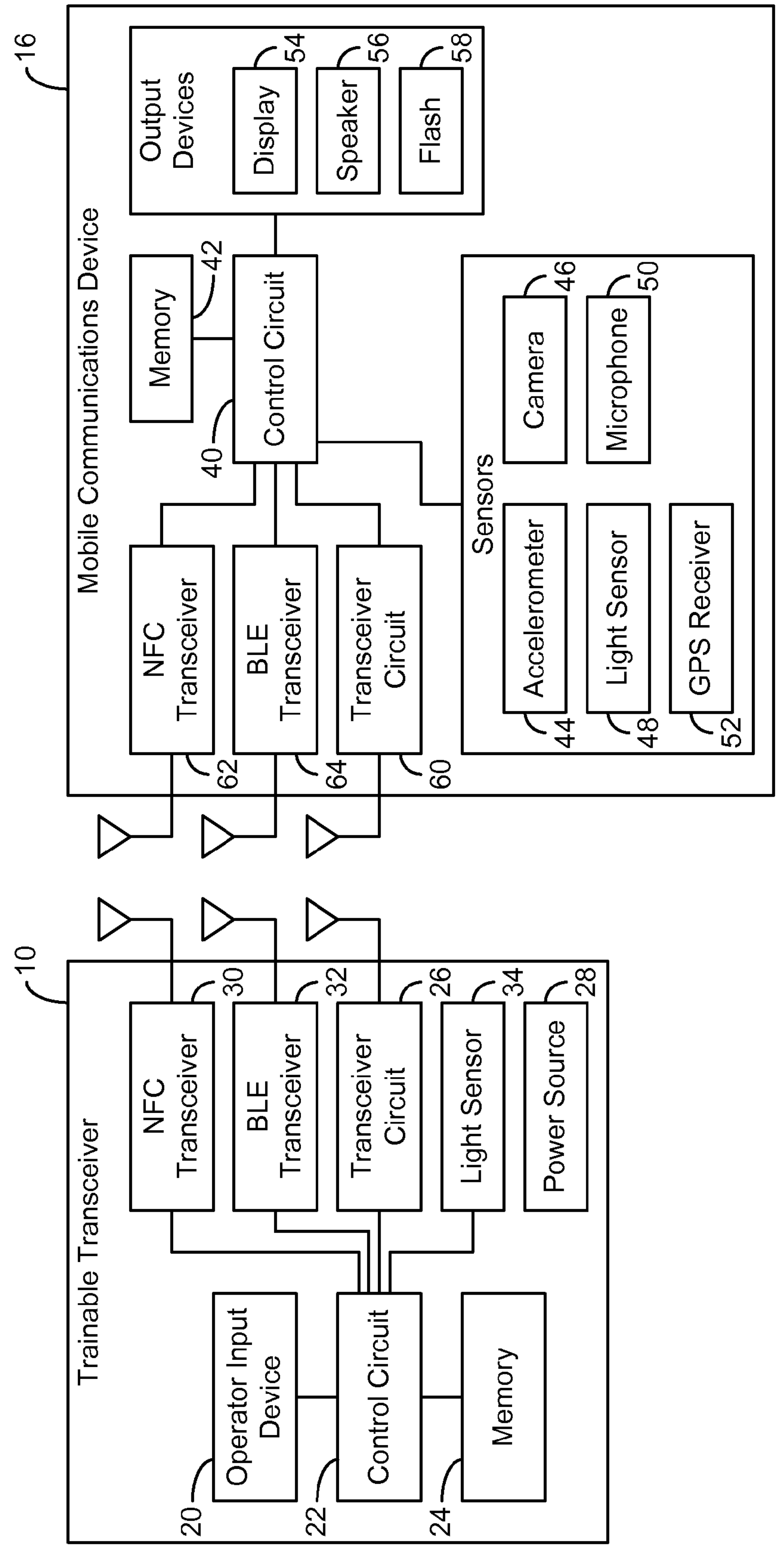
FIG. 2A illustrates a trainable transceiver and a mobile communications device including components for communication using radio frequency transmissions and light transmissions according to an exemplary embodiment.

Referring now to FIG. 2A, an exemplary embodiment of the trainable transceiver 10 is illustrated along with an exemplary embodiment of the mobile communications device 16. In one embodiment, the trainable transceiver 10 includes an operator input device 20. The operator input device 20 may be one or more buttons. For example, the operator input device 20 may be three hard key buttons. In some embodiments, the operator input device 20 may include input devices such as touchscreen displays, switches, microphones, knobs, touch sensor (e.g., projected capacitance sensor resistance based touch sensor, resistive touch sensor, or other touch sensor), proximity sensors (e.g., projected capacitance, infrared, ultrasound, infrared, or other proximity sensor), or other hardware configured to generate an input from a user action. In additional embodiments, the operator input device 20 may display data to a user or other provide outputs. For example, the operator input device 20 may include a display screen (e.g., a display as part of a touchscreen, liquid crystal display, e-ink display, plasma display, light emitting diode (LED) display, or other display device), speaker, haptic feedback device (e.g., vibration motor), LEDs, or other hardware component for providing an output. In some embodiments, the operator input device 20 is connected to a control circuit 22. The control circuit 22 may send information and or control signals or instructions to the operator input device 20. For example, the control circuit 22 may send output instructions to the operator input device 20 causing the display of an image. The control circuit 22 may also receive input signals, instructions, and/or data from the operator input device 20.

The control circuit 22 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the control circuit 22 may be a SoC individually or with additional hardware components described herein. The control circuit 22 may further include, in some embodiments, memory (e.g., random access memory, read only memory, flash memory, hard disk storage, flash memory storage, solid state drive memory, etc.). In further embodiments, the control circuit 22 may function as a controller for one or more hardware components included in the trainable transceiver 10. For example, the control circuit 22 may function as a controller for a touchscreen display or other operator input device 20, a controller for a transceiver, transmitter, receiver, or other communication device (e.g., implement a Bluetooth communications protocol).

In some embodiments, the control circuit 22 receives inputs from operator input devices 20 and processes the inputs. The inputs may be converted into control signals, data, inputs to be sent to the base station, etc. The control circuit may control a transceiver circuit 26 and use the transceiver circuit 26 to communicate (e.g., receive signals and/or transmit signals) with one or more of original transmitters 14, home electronic devices 12, mobile communications devices 16, and/or remote devices. The control circuit 22 may also be used to in the training process.

The control circuit 22 is coupled to memory 24. The memory 24 may be used to facilitate the functions of the trainable transceiver described herein. Memory 24 may be volatile and/or non-volatile memory. For example, memory 24 may be random access memory, read only memory, flash memory, hard disk storage, flash memory storage, solid state drive memory, etc. In some embodiments, the control circuit 22 reads and writes to memory 24. Memory 24 may include computer code modules, data, computer instructions, or other information which may be executed by the control circuit 22 or otherwise facilitate the functions of the trainable transceiver 10 described herein. For example, memory 24 may include encryption codes, pairing information, identification information, a device registry, etc.

The transceiver circuit 26 allows the trainable transceiver 10 to transmit and/or receive wireless communication signals. The wireless communication signals may be transmitted to or received from a variety of wireless devices (e.g., the original transmitter 14, home electronic device 12, mobile communications device 16, and/or remote device). The transceiver circuit 26 may be controlled by the control circuit 22. For example, the control circuit 22 may turn on or off the transceiver circuit 26, the control circuit 22 may send data using the transceiver circuit 26, format information, an activation signal, control signal, and/or other signal or data for transmission via the transceiver circuit 26, or otherwise control the transceiver circuit 26. Inputs from the transceiver circuit 26 may also be received by the control circuit 22. In some embodiments, the transceiver circuit 26 may include additional hardware such as processors, memory, integrated circuits, antennas, etc. The transceiver circuit 26 may process information prior to transmission or upon reception and prior to passing the information to the control circuit 22. In some embodiments, the transceiver circuit 26 may be coupled directly to memory 24 (e.g., to store encryption data, retrieve encryption data, etc.). In further embodiments, the transceiver circuit 26 may include one or more transceivers, transmitters, receivers, etc. For example, the transceiver circuit 26 may include an optical transceiver, near field communication (NFC) transceiver, etc. In some embodiments, the transceiver circuit 26 may be implemented as a SoC.

In further embodiments, the control circuit 22 is coupled to additional transceiver circuits, receivers, and/or transmitters. In one embodiment, the transceiver circuit 26 is used for communicating with (transmitting to and/or receiving from) home electronic devices and/or remote devices. In some embodiments, the transceiver circuit 26 may be or include a cellular transceiver. The trainable transceiver 10 may use the transceiver circuit 26 and/or an additional transceiver (e.g., a cellular transceiver) to access the internet, other networks, and/or network hardware. In other embodiments, the trainable transceiver 10 may access the internet, other networks, and/or network hardware through an intermediate device in communication with the trainable transceiver 10 such as the mobile communications device 16.

Additional transceivers may be used to communicate with other devices (e.g., mobile communications devices, cameras, network devices, or other wireless devices). The transceiver circuit 26 and other transceivers may operate using different frequency, transmission spectrums, protocols, and/or otherwise transmit and/or receive signals using different techniques. For example, the transceiver circuit 26 may be configured to send activation signals to the home electronic device 12 (e.g., a garage door opener) using an encrypted radio wave transmission and an additional transceiver may communicate with a remote communications device (e.g., a smartphone) using a Bluetooth transceiver and Bluetooth communications protocol.

The trainable transceiver 10 may communicate with original transmitters 14, home electronic devices 12, remote devices, mobile communications devices 16, network devices, and/or other devices as described above using the transceiver circuit and/or other additional transceiver circuits or hardware. The devices with which the trainable transceiver communicates may include transceivers, transmitters, and/or receivers. The communication may be one-way or two-way communication.

With continued reference to FIG. 2A, the trainable transceiver 10 may include a power source 28. The power source 28 provides electrical power to the components of the trainable transceiver 10. In one embodiment, the power source 28 is self-contained. For example, the power source 28 may be a battery, solar cell, or other power source not requiring a wired connection to another source of electrical power. In other embodiments, the power source 28 may be a wired connection to another power source. For example, the power source 28 may be a wired connection to a vehicle power supply system. The power source 28 may be integrated into the vehicle electrical system. This may allow the trainable transceiver 10 to draw electrical power from a vehicle battery, be turned on or off by a vehicle electrical system (e.g., turned off when the vehicle is turned off, turned on when a vehicle door is opened, etc.), draw power provided by a vehicle alternator, or otherwise be integrated with the electrical power systems(s) of the vehicle.

In some embodiments, the trainable transceiver 10 includes a near field communication (NFC) transceiver 30. The NFC transceiver 30 may be used to communicate with the mobile communications device 16 and/or other device. For example, the NFC transceiver 30 may be used to pair the mobile communications device 16 such as a smartphone and the trainable transceiver 10. The pairing process may be conducted using NFC. In some embodiments, additional information may be communicated between the trainable transceiver 10 and the mobile communications device 16 and/or other device using NFC.

In some embodiments, the trainable transceiver 10 includes a Bluetooth Low Energy (BLE) transceiver 32. The BLE transceiver 32 may be a radio frequency transceiver configured to communicate using the Bluetooth Low Energy protocol. In other embodiments, the BLE transceiver 32 may be a radio frequency transceiver configured to communicate using a different protocol, such as a Bluetooth protocol (e.g., v2.0, v3.0, v4.0, etc.). The BLE transceiver 32 may facilitate pairing of the trainable transceiver 10 and the mobile communications device 16. For example, the trainable transceiver 10 and mobile communications device 16 may establish a communication connection using the BLE transceiver 32 and exchange information relevant to pairing the two devices for further communication using a BLE protocol. Upon pairing (e.g., using the BLE transceiver 32, NFC transceiver 30, and/or other techniques), the trainable transceiver 10 may communicate with the mobile communications device 16 using the BLE transceiver 32.

In further embodiments, the trainable transceiver 10 may include a speaker and/or microphone. The speaker may be used to provide audio output to a user. The microphone may be used receive user inputs (e.g., voice commands). In further embodiments, the microphone and/or speaker may be used to receive and/or send information using sound waves.

The mobile communications device 16, which may communicate with the trainable transceiver 10 in some embodiments of the trainable transceiver 10, may be a device purchased by a consumer separately from the trainable transceiver 10. For example, the mobile communications device 16 may be a cell phone purchased from a third party retailer. In some embodiments, the mobile communications device 16 (e.g., smartphone, tablet, cellular telephone, laptop, key fob, dongle, etc.) includes a control circuit 40. The control circuit 40 may contain circuitry, hardware, and/or software for facilitating and/or performing the functions described herein. The control circuit 40 may handle inputs, process inputs, run programs, handle instructions, route information, control memory, control a processor, process data, generate outputs, communicate with other devices or hardware, and/or otherwise perform general or specific computing tasks. In some embodiments, the control circuit 40 includes a processor. In some embodiments, the control circuit 40 includes memory. The control circuit 40 may handle computation tasks associated with placing phone calls, running an operating system, running applications, displaying information, general computing, and/or tasks associated with providing smartphone, tablet, laptop and/or other device functions. In some embodiments, the control circuit 40 may include and/or be one more systems on a chip (SoCs), application specific integrated circuits (ASICs), one or more field programmable gate arrays (FPGAs), a digital-signal-processor (DSP), a group of processing components, and/or other suitable electronic processing components.

The mobile communications device 16 may include memory 42. Memory 42 is one or more devices (e.g. RAM, ROM, Flash Memory, hard disk storage, etc.) for storing data and/or computer code for facilitating the various processes described herein. Memory 42 may be or include non-transient volatile memory or non-volatile memory. Memory 42 may include database components, object code components, script components, or any other type of information structure for supporting various activities and information structures described herein. Memory 42 may be communicably connected to the control circuit 40 and provide computer code and/or instructions to the control circuit 40 for executing the processes described herein. For example, memory 42 may contain computer code, instructions, and/or other information of implementing an operating system, one or more applications, and/or other programs.

In some embodiments, the mobile communications device 16 includes one or more sensors. The sensors may be controlled by the control circuit 40, provide inputs to the control circuit 40, and/or otherwise interact with the control circuit 40. In some embodiments, sensors include one or more accelerometers 44, cameras 46, light sensors 48, microphones 50, and/or other sensors or input devices. Sensors may further include a global positioning system (GPS) receiver 52. The GPS receiver 52 may receive position information from another source (e.g., a satellite). The position may be based on GPS coordinates.

The mobile communications device 16 may include output devices. In some embodiments, the output devices are controlled by the control circuit 40, provide input to the control circuit 40, communicate output from the control circuit 40 to a user or other device, and/or are otherwise in communication with the control circuit 40. Output devices may include a display 54. The display 54 allows for visual communication with a user. The display 54 may be configured to output a visual representation based on computer instructions, control signals, computer code, frame buffers, and/or other electronic signals or information. In some embodiments, the display 54 includes a graphics processing unit (GPU), controller, and/or other hardware to facilitate the handling of and display of graphics information. In other embodiments, the display 54 does not include hardware for processing images or image data. The display 54 may be any hardware configured to display images using the emission of light or another technique. For example, the display 54 may be a liquid crystal display, e-ink display, plasma display, light emitting diode (LED) display, or other display device. In some embodiments, the display 54 may be part of or otherwise integrated with a user input device such as a touchscreen display (e.g., projected capacitance touchscreen, resistance based touchscreen, and/or touchscreen based on other touch sensing technology). The 54 display may be a touchscreen display. Output devices may also include a speaker 56 for providing audio outputs. Output devices may further include a flash 58. The flash 58 may be associated with the camera 46 and may be an LED or other light source.

The mobile communications device 16 may include a transceiver circuit 60. The transceiver circuit 60 may be a radio frequency transceiver, cellular transceiver, and/or other transceiver. The transceiver circuit 60 may provide communication between the mobile communications device 16 and a cell tower, voice network, data network, communication network, other device, and/or other hardware components used in communication. The mobile communications device 16 may access the internet and/or other networks using the transceiver circuit 60. In some embodiments, the trainable transceiver 10 and mobile communications device 16 communicate using the transceiver circuit 60 of the mobile communications device 16 and the transceiver circuit 26 of the trainable transceiver 10. Other intermediary devices and/or hardware (e.g., network components) may facilitate communication between the mobile communications device 16 and the trainable transceiver 10. In some embodiments, the mobile communications device 16 may have access to activation signal parameters, training information (e.g., device identification information), and/or other information related to the home electronics device 12 and/or remote device. The mobile communications device 16 may have access to this information through a variety of sources and techniques as discussed in more detail herein. The mobile communications device 16 may transmit activation signal parameters, training information (e.g., device identification information), and/or other information related to the home electronics device 12 and/or remote device using the transceiver circuit 60 of the mobile communications device 16. This information may be received by the trainable transceiver 10 using the transceiver circuit 26 of the trainable transceiver 10.

In some embodiments, the mobile communications device 16 includes an NFC transceiver 62. The NFC transceiver 62 may allow the mobile communications device to wirelessly communicate with the trainable transceiver 10 using NFC. As discussed above, the NFC transceiver 62 of the mobile communications device 16 and the NFC transceiver 30 of the trainable transceiver 10 may allow for wireless communication between the trainable transceiver 10 and the mobile communications device 16. In some embodiments, the wireless communication via the NFC transceivers allows for the trainable transceiver 10 and mobile communications device 16 to be paired and therefore allow for further communication using the NFC transceivers and/or other transceivers described herein. In some embodiments, the mobile communications device 16 may have access to activation signal parameters, training information (e.g., device identification information), and/or other information related to the home electronics device 12 and/or remote device. The mobile communications device 16 may have access to this information through a variety of sources and techniques as discussed in more detail herein. The mobile communications device 16 may transmit activation signal parameters, training information (e.g., device identification information), and/or other information related to the home electronics device 12 and/or remote device using the NFC transceiver 62 of the mobile communications device 16. This information may be received by the trainable transceiver 10 using the NFC transceiver 30 of the trainable transceiver 10.

In some embodiments, the mobile communications device 16 includes a BLE transceiver 64. The BLE transceiver 64 may allow the mobile communications device 16 to wirelessly communicate with the trainable transceiver 10 using a Bluetooth protocol such as BLE. As discussed above, the BLE transceiver 64 of the mobile communications device 16 and the BLE transceiver 32 of the trainable transceiver 10 may allow for wireless communication between the trainable transceiver 10 and the mobile communications device 16. In some embodiments, the wireless communication via the BLE transceivers allows for the trainable transceiver 10 and mobile communications device 16 to be paired and therefore allow for further communication using the BLE transceivers and/or other transceivers described herein. Alternatively, the trainable transceiver 10 and the mobile communications device 16 may be paired by another technique (e.g., using the NFC transceivers) which allows for further communication using BLE transceivers. In some embodiments, the mobile communications device 16 may have access to activation signal parameters, training information (e.g., device identification information), and/or other information related to the home electronics device 12 and/or remote device. The mobile communications device 16 may have access to this information through a variety of sources and techniques as discussed in more detail herein. The mobile communications device 16 may transmit activation signal parameters, training information (e.g., device identification information), and/or other information related to the home electronics device 12 and/or remote device using the BLE transceiver 64 of the mobile communications device 16. This information may be received by the trainable transceiver 10 using the BLE transceiver 32 of the trainable transceiver 10.

With continued reference to FIG. 2A, the trainable transceiver may include a light sensor 34 (e.g., photodetector) in some embodiments. As described above, the mobile communications device 16 may include the light sensor 48 and the display 54, flash 58, and/or other light source. The light sensor 3464 of the trainable transceiver 10 may be configured to receive information transmitted from a source, such as the mobile communications device 16, using light.

Figure 2B:
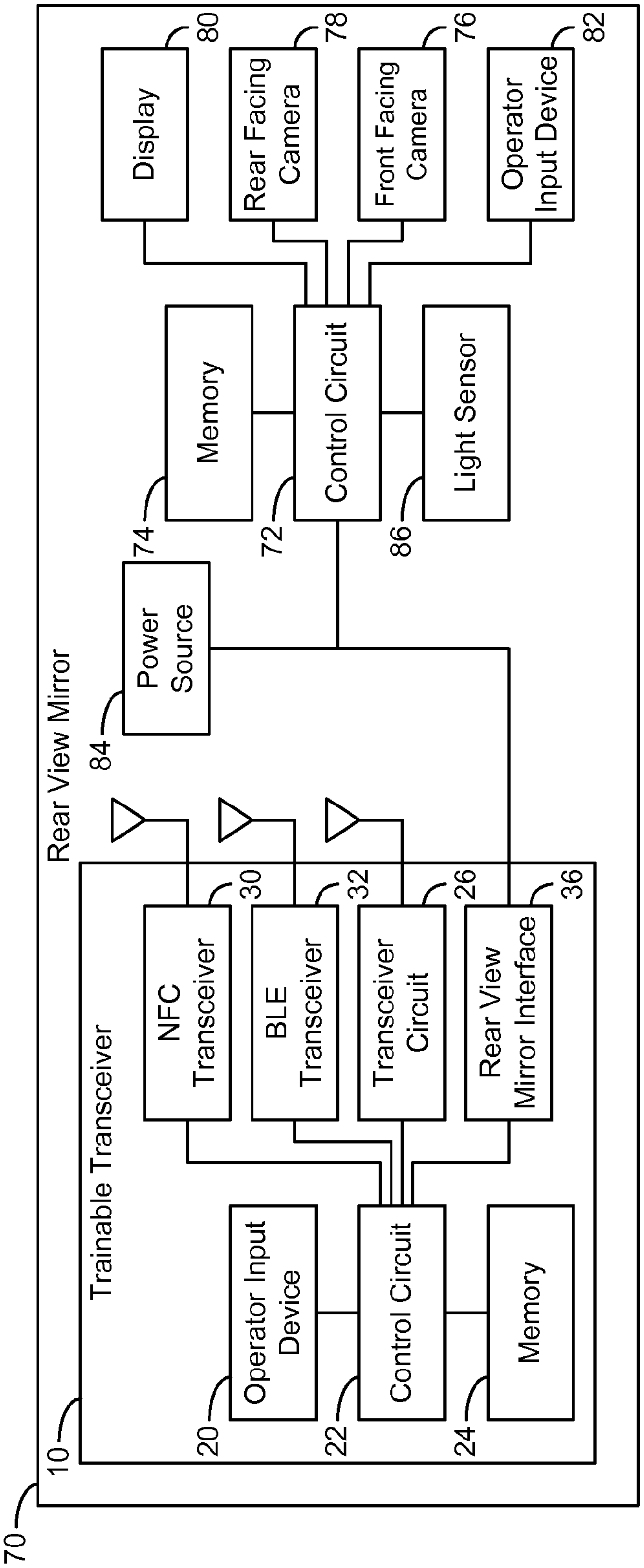
FIG. 2B illustrates a trainable transceiver integrated with a rear view mirror of a vehicle including a light sensor according to an exemplary embodiment.

Referring now to FIG. 2B, the trainable transceiver 10 may be coupled to, integrated with, and/or otherwise be in communication with a rear view mirror 70 of the vehicle. Advantageously, this may allow the trainable transceiver 10 to use hardware associated with the rear view mirror 70 rather than duplicating the same hardware for use with the trainable transceiver 10. This may save cost, simplify the manufacturing process, and/or otherwise improve the trainable transceiver system. The rear view mirror 70 may be installed in a vehicle as part of an original vehicle manufacturing process, as an additional piece of hardware, as part of a retrofit instillation, to replace an existing mirror, or otherwise be added to a vehicle. The rear view mirror 70 may be uninstalled in a vehicle (e.g., packaged for sale for later installation in a vehicle).

In one embodiment, the rear view mirror 70 includes a control circuit 72. The control circuit 72 may contain circuitry, hardware, and/or software for facilitating and/or performing the functions described herein. The control circuit 72 may handle inputs, process inputs, run programs, handle instructions, route information, control memory, control a processor, process data, generate outputs, communicate with other devices or hardware, and/or otherwise perform general or specific computing tasks. In some embodiments, the control circuit 72 includes a processor. The processor may be implemented as a general-purpose processor, an application specific integrated circuit (ASIC), one or more field programmable gate arrays (FPGAs), a digital-signal-processor (DSP), a group of processing components, or other suitable electronic processing components.

In some embodiments, the control circuit 72 is coupled to memory 74. Memory 74 is one or more devices (e.g. RAM, ROM, Flash Memory, hard disk storage, etc.) for storing data and/or computer code for facilitating the various processes described herein. Memory 74 may be or include non-transient volatile memory or non-volatile memory. Memory 74 may include database components, object code components, script components, or any other type of information structure for supporting various activities and information structures described herein. Memory 74 may be communicably connected to the control circuit 72 and provide computer code or instructions to the control circuit 72 for executing the processes described herein.

In some embodiments, the rear view mirror 70 includes one or more front facing cameras 76 and/or one or more rear facing cameras 78. The front facing camera 76 may be used alone or in conjunction with the control circuit 72 of the rear view mirror 70 to perform a variety of functions. For example, the front facing camera 76 may be used to provide driver aids such as automatically dimming headlights when oncoming cars are detected (e.g., by the headlights of the oncoming car).

In one embodiment, the rear view mirror 70 includes a display 80. The display 80 allows for visual communication with a user. The display 80 may be configured to output a visual representation based on computer instructions, control signals, computer code, frame buffers, and/or other electronic signals or information. In some embodiments, the display 80 includes a graphics processing unit (GPU), controller, and/or other hardware to facilitate the handling of and display of graphics information. In other embodiments, the display 80 does not include hardware for processing images or image data. The display 80 may be any hardware configured to display images using the emission of light or another technique. For example, the display 80 may be a liquid crystal display, e-ink display, plasma display, light emitting diode (LED) display, or other display device. In some embodiments, the display 80 may be part of or otherwise integrated with a user input device such as a touchscreen display (e.g., projected capacitance touchscreen, resistance based touchscreen, and/or touchscreen based on other touch sensing technology). The display 80 be a touchscreen display. In some embodiments, the display 80 is controlled by the control circuit 72 of the rear view mirror 70. The display 80 may be used for functions such as displaying weather information, backup camera video feeds, warnings, compass heading, road information (e.g., current speed limit), navigation information, vehicle information (e.g., if a passenger is not wearing a seat belt), or information accessible by the vehicle and/or a vehicle connected device (e.g., paired smartphone). The display 80 may be located behind the glass of the mirror assembly itself. The display 80 may be used to display images but, when not in use, function as part of the mirror, allowing a user to see towards the rear of the vehicle.

In some embodiments, the rear view mirror includes an operator input device 82. The operator input device 82 may allow a user to provide inputs to the control circuit 72 of the rear view mirror 70. The operator input device 82 may include soft keys (touch screens, projected capacitance based buttons, resistance based buttons, etc.) and/or hard keys (e.g., buttons, switches knobs, etc.), microphones, and/or other hardware configured to accept user inputs. The operator input device 82 may allow a user to control functions associated with the rear view mirror 70 such as dimming, turning on or off auto dimming, placing an emergency call, etc. The operator input device 82 of the rear view mirror 70 is coupled to the control circuit 72 of the rear view mirror 70. The rear view mirror 70 may process inputs received from the operator input device 82 (e.g., change the display, dim the mirror, play a sound using the speaker, or otherwise take an action, process the input, and/or generate an output).

In one embodiment, the rear view mirror includes a power source 84. The power source 84 may be a replaceable or rechargeable battery. In other embodiments, the power source 84 may be a connection to a vehicle electrical system. For example, the components of the rear view mirror 70 may draw electrical power from a controller area network (CAN) bus, vehicle battery, vehicle alternator, and/or other vehicle system to which the components of the rear view mirror 70 are electrically connected.

In some embodiments, the rear view mirror 70 includes an integral transceiver, such as a cellular transceiver, Bluetooth transceiver, etc., or a connection to a transceiver coupled to the vehicle in which the rear view mirror 70 is or will be mounted. Using this transceiver and/or additional hardware, the rear view mirror 70 may have or be capable of providing access to the internet and/or communication to other devices and/or hardware (e.g., using radio frequency transmissions).

The rear view mirror 70 may include one or more sensors. For example, the rear view mirror 70 may include light sensors 86, temperature sensors, accelerometers, humidity sensors, microphones, and/or other sensors. Sensors may be used to display information to an occupant of vehicle (e.g., current weather conditions) using the display 80 of the rear view mirror 70 and/or other displays in the vehicle (e.g., center stack display, gauge cluster display, heads up display (HUD), etc.). Sensors may also be used to accept user input and/or measure parameters related to the vehicle. For example, the microphone may be used to accept voice commands from an occupant of the vehicle. In some embodiments, the control circuit 72 of the rear view mirror 70 may transmit, communicate, and/or otherwise pass sensor data, signals, outputs, and/or other information to other hardware (e.g., the trainable transceiver 10).

With continued reference to FIG. 2B, the trainable transceiver 10 includes a rear view mirror interface 36 in some embodiments. The rear view mirror interface 36 may allow for communication between the trainable transceiver 10 and the control circuit 72 of the rear view mirror 70. In one embodiment, rear view mirror interface 36 includes physical connection such as ports, connectors, wiring, and/or other hardware used to create an electrical connection between the control circuit 22 of the trainable transceiver 10 and the control circuit 72 of the rear view mirror 70. In alternative embodiments, the control circuit 22 of the trainable transceiver 10 and the control circuit 72 of the rear view mirror 70 are directly connected (e.g., wired such that outputs from one control circuit are received as inputs at the other control circuit and/or vice versa). In further embodiments, the rear view mirror interface 36 may include and/or be implemented by computer programming, code, instructions, or other software stored in memory in the trainable transceiver 10 and/or rear view mirror 70. Advantageously, the connection between the trainable transceiver 10 and the rear view mirror 70 may allow for components of the rear view mirror 70 to serve two or more functions thus increasing the usefulness of these components, reducing cost, and/or eliminating the need for duplicate components to provide additional functions to the trainable transceiver 10. For example, the display 80 of the rear view mirror 70 may be used to communicate information relevant to the operation of the rear view mirror 70 (e.g., weather information, if the mirror is set to automatically dim, vehicle warnings, etc.) and information relevant to the trainable transceiver 10 (e.g., training steps, pairing information, whether an activation signal has been received, status information regarding a home electronics device, mobile communications device, and/or remote device, and/or other information related to the trainable transceiver 10).

The connection between the trainable transceiver 10 and the rear view mirror hardware may allow the trainable transceiver 10 to control the hardware included in the rear view mirror 70, send control signals and/or instructions to the control circuit 72 of the rear view mirror 70, receive images and/or image data from the camera(s) 76 and/or 78 included in the rear view mirror 70 (e.g., via the control circuit 72 of the rear view mirror), receive control signals and/or instructions, receive sensor information from sensors included in the rear view mirror 70 (e.g., via the control circuit 72 of the rear view mirror 70), and/or otherwise interact with the rear view mirror 70 and/or components thereof.

The trainable transceiver 10 may be configured to control, communicate, or otherwise operate in conjunction with the control circuit 72 of the rear view mirror 70 to facilitate and/or perform the functions described herein. In one embodiment, the trainable transceiver 10 communicates with the control circuit 72 of the rear view mirror 70 through the rear view mirror interface 36. In other embodiments, the trainable transceiver 10 communicates with the control circuit 72 of the rear view 70 mirror directly (e.g., the control circuit 22 of the trainable transceiver communicates with the control circuit of the rear view mirror). The trainable transceiver may communicate and/or control the control circuit of the rear view mirror using a variety of techniques. For example, the trainable transceiver may communicate with the rear view mirror through outputs from the trainable transceivers received as inputs at the control circuit of the rear view mirror, sending the rear view mirror a location in memory which contains information instructions, data, or other information which is read by the control circuit of the rear view mirror, sending the control circuit of the rear view mirror data, instructions, or other information through a bus, port, or other connection, or otherwise providing instructions, data, or information to the control circuit of the rear view mirror.

In some embodiments, the control circuit 72 of the rear view mirror 70 communicates with the control circuit 22 of the trainable transceiver 10 using similar techniques. In other embodiments, the communication is one way with the trainable transceiver 10 sending instructions, data, or other information to the control circuit 72 of the rear view mirror 70. The trainable transceiver 10 may extract data, instructions, or other information from the control circuit 72 of the rear view mirror 70 by reading the memory 74 of the rear view mirror 70 and/or requesting from the control circuit 72 of the rear view mirror 70 an address for a location in memory 74 in which the relevant information can be read. Alternatively, the control circuit 72 of the rear view mirror 70 may send information to the trainable transceiver 10 but only when requested by the trainable transceiver 10.

In one embodiment, the trainable transceiver 10 is configured to provide output to a vehicle occupant using the display 80 and/or speaker of the rear view mirror 70. The trainable transceiver 10 may control the output of the rear view mirror 70 by sending control signals, instructions, information, and/or data to the rear view mirror 70 or otherwise control the display 80 and/or speaker of the rear view mirror 70. In one embodiment, the trainable transceiver 10 controls the output of the rear view mirror 70 using the rear view mirror interface 36. For example, the rear view mirror interface 36 may format instructions, control signals, and/or information such that it can be received and/or processed by the control circuit 72 of the rear view mirror 70. In other embodiments, the control circuit 22 of the trainable transceiver 10 may communicate directly with the control circuit 72 of the rear view mirror 70. The control circuit 72 of the rear view mirror 70 may handle, process, output, forward and/or otherwise manipulate instructions, control signals, data, and/or other information from the trainable transceiver 10. In other embodiments, the control circuit 72 of the rear view mirror 70 forwards, routes, or otherwise directs the instructions, control signals, outputs, data, and/or other information to other components of the rear view mirror 70 without additional processing or manipulation. For example, the trainable transceiver 10 may output a frame buffer to the control circuit 72 of the rear view mirror 70 which then routes the frame buffer to the display 80 without further manipulation. This may include storing the frame buffer in memory included in the control circuit 72 of the rear view mirror 70 and sending an address corresponding to the frame buffer to the display 80. As described in greater detail with respect to later figures, the display 80 may be used by the trainable transceiver 10 to communicate information to a vehicle occupant regarding the home electronics device 12, remote device, mobile communications device 16, or other device controlled by and/or in communication with the trainable transceiver 10.

Advantageously, displaying information related to the trainable transceiver 10 using the display 80 of the rear view mirror 70 may make a user more likely to view the information. Vehicle occupants, particularly the driver, are accustomed to looking at the rear view mirror 70 frequently. A vehicle driver may be particularly likely to look at the rear view mirror 70 while reversing out of a garage and/or down a driveway. As such, a vehicle driver is more likely to see information from the trainable transceiver 10 related to the home electronics device 12 (e.g., a garage door opener) if the information is displayed on the rear view mirror 70 rather than in another location.

The trainable transceiver 10 may be configured to receive inputs from the sensors of the rear view mirror and/or control sensors of the rear view mirror 70. The trainable transceiver 10 may access sensor data and/or control sensor data through the rear view mirror interface 36 and/or the control circuit 72 of the rear view mirror 70. In other embodiments, sensor data may be accessed and/or sensors controlled by the control circuit 22 of the trainable transceiver 10 and/or the control circuit 72 of the rear view mirror 70. The trainable transceiver 10 may receive sensor data and process, transmit, format, send data to other devices, and/or otherwise manipulate the sensor data. The trainable transceiver 10 may also control sensors. For example, the trainable transceiver 10 may turn sensors on or off, calibrate sensors, and/or otherwise manipulate sensors. In some embodiments, the trainable transceiver 10 receives commands, instructions, data, and/or other information through one or more sensors. For example, the trainable transceiver 10 may receive voice commands from a user through the microphone. Continuing the example, data may be optically received using the light sensor. In some embodiments, the trainable transceiver 10 receives information (e.g., information input through physical interaction with the rear view mirror 70) through the accelerometer of the rear view mirror.

In some embodiments, the trainable transceiver 10 receives inputs from the operator input device 82 of the rear view mirror 70 (e.g., via the control circuit 72 of the rear view mirror 70 and/or the rear view mirror interface 36). The trainable transceiver 10 may send a control signal, instructions, information or otherwise communicate with the control circuit 72 of the rear view mirror 70 to cause inputs to be communicated to the trainable transceiver 10. The trainable transceiver 10 may use the operator input device 82 of the rear view mirror 70 to augment or replace the operator input device 20 associated with the trainable transceiver 10.

In some embodiments, the trainable transceiver 10 draws electrical power through a connection with the power source 84 included in the rear view mirror 70. As explained above, the power source 84 may provide power to the rear view mirror 70 from the electrical system of the vehicle and/or a battery. The trainable transceiver 10 may draw power from the power source 84 as well. For example, the trainable transceiver 10 may be connected to the power source 84 through the rear view mirror interface 36. Alternatively, components of the trainable transceiver 10 may draw power from direct connections to the power source 84. In other embodiments, the trainable transceiver 10 draws power from the control circuit 72 of the rear view mirror 70 which in turn draws power from the power source 84.

In one embodiment, the trainable transceiver 10 may use a transceiver included in the rear view mirror 70 and/or coupled to the rear view mirror 70 (e.g., a transceiver mounted in the vehicle) to send and/or receive activation signals, control signals, images, image data, and/or other information. For example, the trainable transceiver 10 may configure the transceiver and/or control circuit 72 of the rear view mirror 70 such that the trainable transceiver 10 has access to the internet, other networks, and/or networking hardware. In some embodiments, the trainable transceiver 10 may use a transceiver associated with the rear view mirror 70 to access other devices (e.g., home electronic devices, remote devices, mobile communications devices, networking devices, etc.).

Figure 2C:
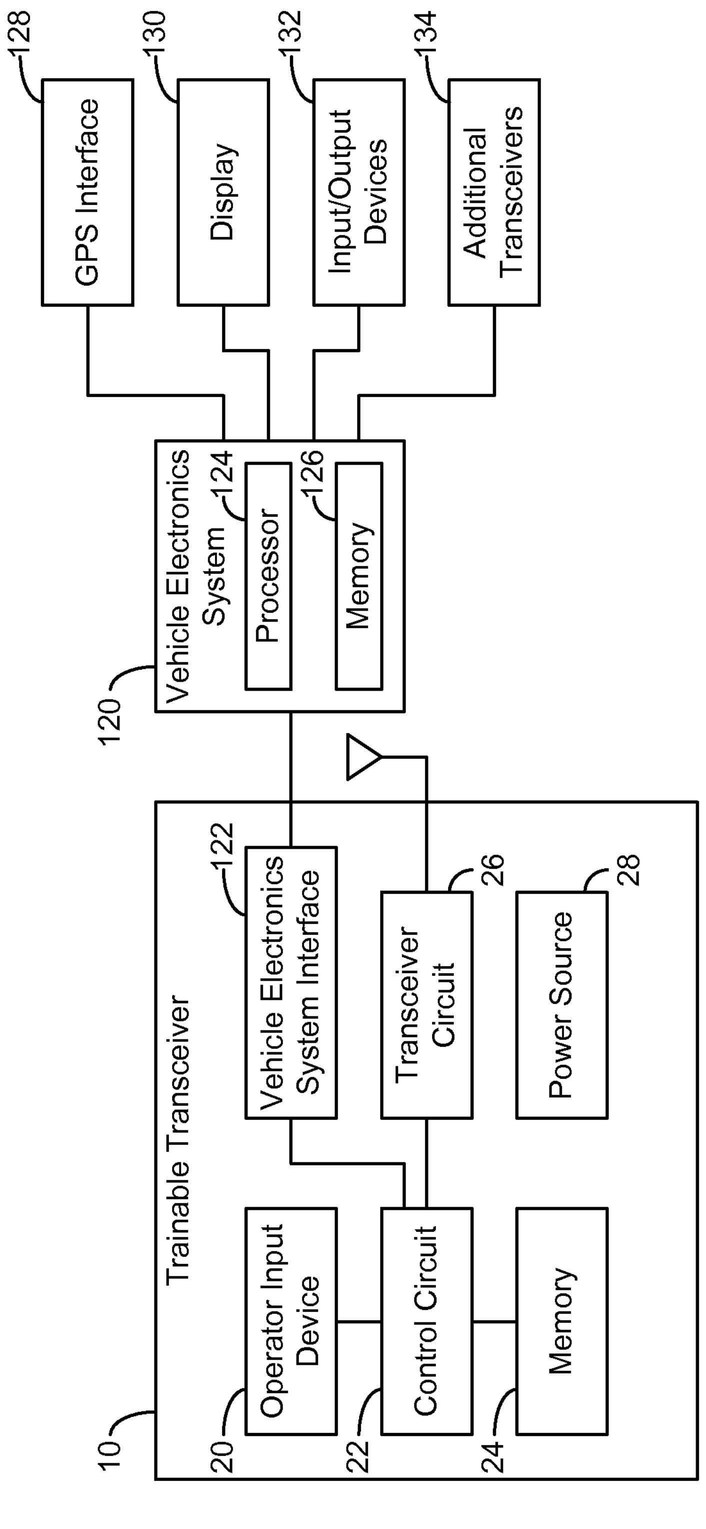
FIG. 2C illustrates an exemplary embodiment of a trainable transceiver connected to a vehicle electronics system.

Referring now to FIG. 2C, the trainable transceiver 10 is illustrated, according to an exemplary embodiment, including a connection to a vehicle electronics system 120. The connection to the vehicle electronics system 120 may be made using a vehicle electronics system interface 122 included in the trainable transceiver 10. In some embodiments, the vehicle electronics system interface 122 includes physical connection such as ports, connectors, wiring, and/or other hardware used to create an electrical connection between the control circuit 22 of the trainable transceiver 10 and the vehicle electronics system 120. In alternative embodiments, the control circuit 22 of the trainable transceiver 10 and the vehicle electronics system 120 are directly connected (e.g., wired such that outputs from one control circuit are received as inputs at the other control circuit and/or vice versa). In further embodiments, the vehicle electronics system interface 122 may include and/or be implemented by computer programming, code, instructions, or other software stored in memory 24 in the trainable transceiver 10 and/or rear view mirror. Advantageously, the connection between the trainable transceiver 10 and the vehicle electronics system 120 may allow for the trainable transceiver 10 to access, control, provide outputs to, receive inputs from, and/or otherwise communicate with components of the vehicle. The connection between the trainable transceiver 10 and the vehicle electronics system 120 may provide an advantage of allowing the trainable transceiver 10 to make use of existing vehicle hardware for use with functions of the trainable transceiver 10. Duplicative hardware may not be required thereby reducing cost and/or complexity of the trainable transceiver 10 by making use of existing hardware.

The vehicle electronics system may include processors 124 (e.g., electronic control units (ECU), engine control modules (ECM), or other vehicle processors), memory 126, buses (e.g., controller area network (CAN) bus, sensors, on-board diagnostics equipment (e.g., following the (OBD)-II standard or other protocol), cameras, displays, transceivers, infotainment systems, and/or other components integrated with a vehicle's electronics systems or otherwise networked (e.g., a controller area network of vehicle components). For example, the vehicle electronics system 120 may include, be coupled to, and/or otherwise communicate with a GPS interface 128. The GPS interface 128 may be configured to receive position information (e.g., from a GPS satellite source). Using the vehicle electronics system 120, vehicle electronics system interface 122, and/or control circuit 22, the trainable transceiver 10 may have access to position information from the GPS interface 128 (e.g., GPS coordinates corresponding to the current location of the vehicle).

Continuing the example, the vehicle electronics system 120 may include, be coupled to, and/or otherwise communicate with a display 130 of the vehicle. The display 130 may include or be a dashboard display, instrument panel display, infotainment display, rear view mirror display, rear seat display, and/or other displays in the vehicle. Using the vehicle electronics system 120, vehicle electronics system interface 122, and/or control circuit 22, the trainable transceiver 10 may have access to the display 130 of the vehicle. The trainable transceiver 10 may output images (e.g., using a frame buffer) to one or more displays 130 of the vehicle. The trainable transceiver 10 may output information related to training the trainable transceiver 10 (e.g., steps, procedures, instructions, current progress, etc.), information related to a home electronics device and/or remote device (e.g., status information, training information, identification information, etc.), diagnostic information, and/or other information accessible to the trainable transceiver 10 directly or through an intermediate device.

Continuing the example, the vehicle electronics system 120 may include, be coupled to, and/or otherwise communicate with input/output devices 132 of the vehicle. Input/output devices 132 may include hardware for receiving user input and providing output to a user. Input/output device 132 may include operator input devices, hardkey buttons, softkey buttons, touchscreens, microphones, speakers, displays, and/or other hardware. Using the vehicle electronics system 120, vehicle electronics system interface 122, and/or control circuit 22, the trainable transceiver 10 may receive inputs from and/or generate outputs using input/output devices 132 of the vehicle.

Continuing the example, the vehicle electronics system 120 may include, be coupled to, and/or otherwise communicate with additional transceivers 134 included in the vehicle. Additional transceivers may include NFC transceivers (e.g., used for pairing the mobile communications device 16 with an infotainment system), BLE transceivers (e.g., used for wireless communication between the mobile communications device 16 and an infotainment system), cellular transceivers (e.g., used for accessing the internet with the vehicle infotainment system and/or other hardware), radio transceivers (e.g., for FM radio, AM radio, high definition radio, satellite radio, etc.), and/or other transceivers. Using the vehicle electronics system 120, vehicle electronics system interface 122, and/or control circuit 22, the trainable transceiver 10 may receive information from, send information to, control, communicate, and/or otherwise interact with additional transceivers 134 of the vehicle. In some embodiments, the trainable transceiver 10 may use additional transceivers 134 of the vehicle to communicate with other devices such as home electronics devices, remote devices, and/or mobile devices. In further embodiments, the trainable transceiver 10 may use additional transceivers of the vehicle to access the internet, communicate with servers, access other networks, and/or otherwise communicate with network hardware.

Figure 3A:
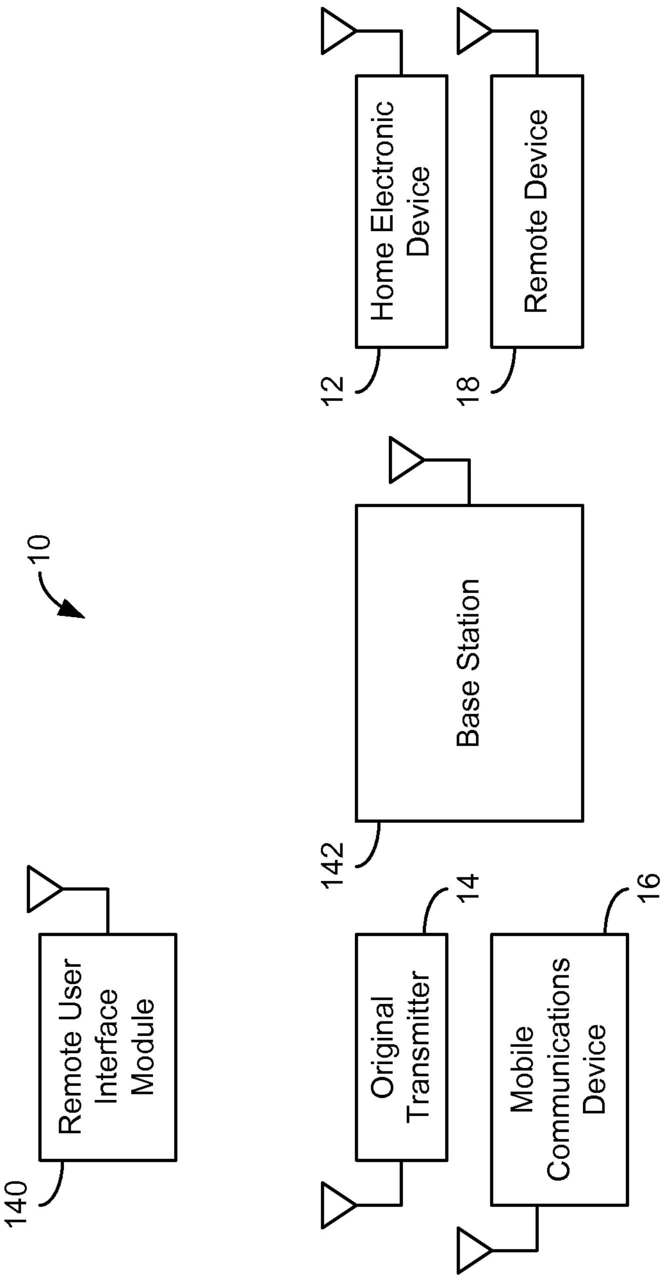
FIG. 3A illustrates an exemplary embodiment of a distributed trainable transceiver having a remote user interface module and a base station.
Figure 3B:
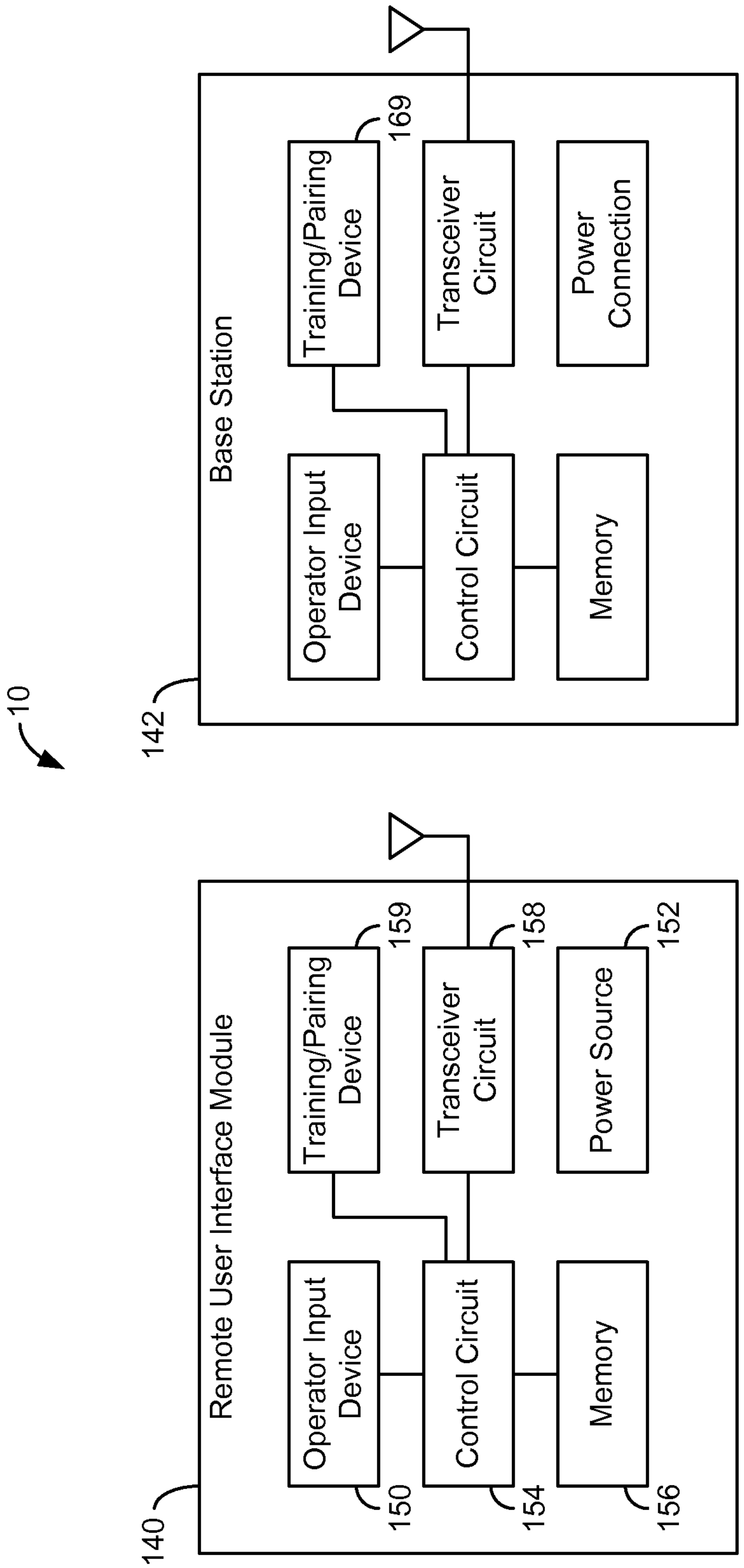
FIG. 3B illustrates the components which may be included in a remote user interface module and base station in one embodiment.

Referring now to FIGS. 3A and 3B, the trainable transceiver 10 may include two modules, a remote user interface module 140 and a base station 142. In one embodiment, the trainable transceiver 10 is a distributed system. The remote user interface module 140 may contain operator input devices 150, a power source 152, a control circuit 154, memory 156, output devices, and/or communications hardware. The remote user interface module 140 may communicate with the base station 142 located apart from the remote user interface module 140. For example, the remote user interface module 140 may include a transceiver circuit 158 used to communicate with the base station 142. The base station 142 may communicate with the remote user interface module using a transceiver circuit 168 and/or an additional transceiver such as those discussed above. The remote user interface module 140 may process user inputs and send information to the base station 142 with the transceiver circuit 158 configured to send an activation signal and/or other signal to another device. The transceiver circuit 168 in the base station 142 may be more powerful (e.g., longer range) than the transceiver circuit(s) 158 in the remote user interface module 140.

In some embodiments, the remote user interface module 140 may contain a transceiver configured to allow communication between the remote user interface module and another device such as a remote device 18 and/or mobile communications device 16. The remote user interface module 140 may serve as a communication bridge between the remote device 18 or mobile communications device 16 and another device such as the base station 142 or the home electronics device 12 or remote device in communication with the base station 142.

In other embodiments, the base station 142 may include a transceiver configured to allow communication between the remote user interface module 140 and another device such as the remote device 18 and/or mobile communications device 16. In some embodiments, the remote user interface module 140 includes a training/pairing device 159 and/or the base station 142 include a training/pairing device 169. The training/pairing devices 159 and 169 may be or include one or more transceivers (e.g., NFC transceiver, BLE transceiver, etc.), microphones, speakers, light sensors, light sources, and/or other hardware for communication between devices. The training/pairing devices 159 and 169 may allow for communication using one or more of the techniques described above with reference to FIGS. 2D-2D (e.g., BLE communication, NFC communication, light based communication, sound based communication, etc.). The training/pairing device 159 of the remote user interface module 140 may allow the remote user interface module 140 to communicate with the mobile communications device 16 and/or the base station 142. The training/pairing device 169 of the base station 142 may allow the base station 142 to communicate with the mobile communications device 16 and/or the remote user interface module 140. Communication may include pairing the mobile communications device 16 such that communications with the mobile communications device 16 are possible, pairing the remote user interface module 140 and the base station 142 such that communication between the two is possible, sending and/or receiving data, and/or other communication. In some embodiments, activation signal parameters, training information (e.g., device identification information), and/or other information related to the home electronics device 12 and/or remote device 18 are communicated between the mobile communications device 16 and the remote user interface module 140 and/or base station 142. In further embodiments, activation signal parameters, training information (e.g., device identification information), and/or other information related to the home electronics device 12 and/or remote device 18 are communicated between a remote user interface module 140 and base station 142. Communication may be unidirectional or bidirectional.

In some embodiments, the base station 142 is coupled to, connected to, and/or otherwise in communication with a system of the vehicle. For example, the base station 142 may be plugged into a power source of the vehicle such as a USB port, 12 volt power port, cigarette lighter, and/or other power source of the vehicle. In further embodiments, the base station 142 may be in communication with a vehicle electronics system. The remote user interface module 140 may be located within the vehicle remote from the base station 142. For example, the remote user interface module 140 may be coupled to a vehicle visor, rear view mirror, windshield, center counsel, and/or other vehicle component.

Referring generally to FIGS. 1-3B, the mobile communications device 16 includes an application configured to interact with the mobile communications device 16 and the trainable transceiver 10, in some embodiments. For example, the application may control a transceiver of the mobile communications device 16 for the function of communicating with the trainable transceiver 10. The application may facilitate communication between the mobile communications device 16 and the trainable transceiver 10, allow a user to configure or train the trainable transceiver 10, be used to acquire activation signal parameters stored locally (e.g., with the application in memory) and/or remotely (e.g., on a server accessible to the application using a connection to the internet provided by the mobile communications device 16), be used to transmit activation signal parameter to the trainable transceiver 10, and/or perform other functions described herein with respect to the mobile communications device 16 and/or trainable transceiver 10.

In some embodiments, the trainable transceiver 10 may access the internet using a communications connection with the mobile communications device 16. For example, the trainable transceiver 10 may transmit requests, control instructions, and/or other information to the mobile communications device causing the mobile communications device 16 to access information, send information, and/or otherwise retrieve information using an internet connection (e.g., through a cellular transceiver and/or other transceiver). The mobile communications device 16 may transmit the resulting information and/or data to the trainable transceiver 10. The mobile communications device 16 may serve as intermediary device which is used by the trainable transceiver 10 to communicate with other devices (e.g., servers, networking equipment, other mobile communications device, home electronics devices, remote devices, and/or other devices). In some embodiments, the trainable transceiver 10 may use the mobile communications device 16 to retrieve activation signal parameters, training information (e.g., device identification information), and/or other information related to the home electronics device 12 and/or remote device 18.

In some embodiments, the trainable transceiver 10 may communicate with other devices (e.g., mobile communications devices, home electronics devices, remote devices, network hardware, and/or other devices) using other techniques. These techniques may be used in addition to or in place of those previously described. For example, short message service (SMS) messages, internet communication protocols, inductive coupling, mini access point protocols (e.g., a device may be or include a mini access point that allows communication without requiring a connection to the internet, web based interfaces, and/or other communications techniques may be used.

In some embodiments, free-space optical communication techniques and/or techniques in which data is encoded onto light emitted by a light source through modulation of the light source (e.g., frequency modulation, amplitude modulation, etc.) may be used for wireless communications between one or more of the devices illustrated in FIG. 1. For example, the devices may include light sources such as light emitting diodes and light sensors (e.g., a camera, photodector) used to generate light based signals and to receive light based signals. This and/or other hardware (e.g., control circuit) or software may allow two or more devices to communicate using light. In other embodiments, two or more of the devices illustrated in FIG. 1 communicate using sound based communication. For example, a modulated sound wave technique, technique based on the frequency, wavelength, amplitude, Decibel, and/or other parameters of the sound wave(s), protocol (e.g., fax protocol), and/or other technique may be used to communicate using sound waves. The sound waves may be in the ultrasound frequency spectrum, acoustic (e.g., audible) spectrum, infrasound spectrum, and/or other spectrum. The devices may include hardware and/or software used in communicating with sound such as control circuits, speakers, microphones, and/or other hardware and/or software used to facilitate sound based communication. In further embodiments, other types of communication may be used. For example, two devices may communicate by exchanging machine readable images containing encoded information (e.g., a display of a first device displays a machine readable image read by a camera of a second device an decoded using a control circuit), by exchanging text messages, by exchanging e-mails, and/or using other types of communication.

Figure 4:
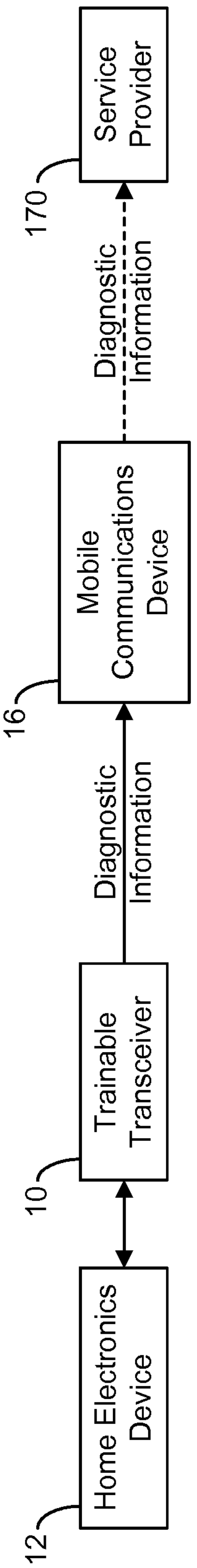
FIG. 4 illustrates an exemplary embodiment of a trainable transceiver configured to provide diagnostic information to a service provider using a mobile communications device.
Figure 5:
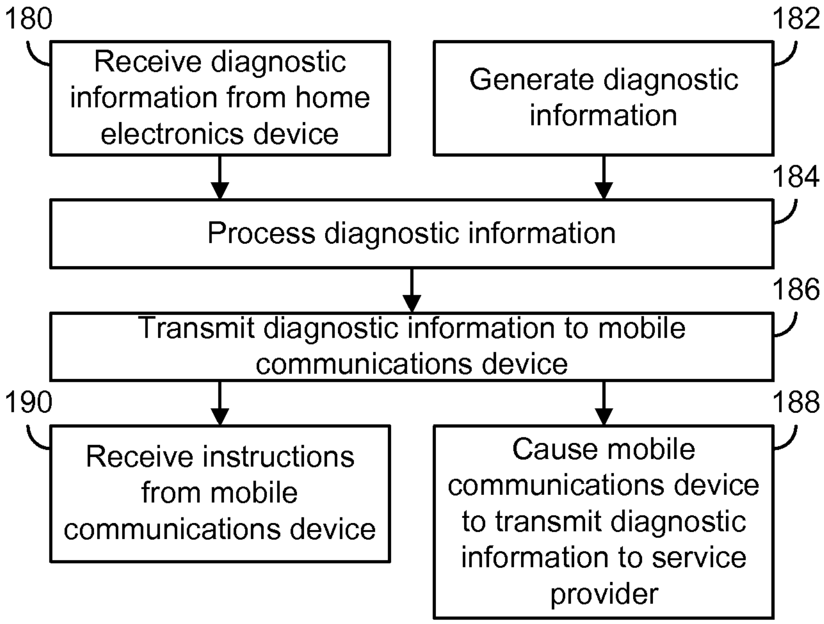
FIG. 5 illustrates a flow chart for a trainable transceiver to generate and process diagnostic information according to an exemplary embodiment.

Referring now to FIGS. 4-5, the mobile communications device 16 may be used to provide access to diagnostic information related to the trainable transceiver 10 and/or the home electronics devices, remote devices, and/or other devices in communication with the trainable transceiver 10. In one embodiment, the trainable transceiver 10 communicates diagnostic information to the mobile communications device 16 using one or more of the techniques described in reference to FIGS. 2A-3B (e.g., using a BLE transceiver). Diagnostic information may include what devices the trainable transceiver 10 is trained to control (e.g., the serial numbers, makes, models, activation signal parameters signal parameters, training information, and/or other information related to the devices), the signal strength of signals received from devices the trainable transceiver 10 is trained to control, the status of the devices, the power levels of the devices, and/or other information related to the devices. In some embodiments, diagnostic information may include additional information about the trainable transceiver 10 such as what hardware is functioning normally, what hardware is not functioning normally, what mobile communications devices are paired to the trainable transceiver 10, and/or other information.

In further embodiments, diagnostic information may include statistical information related to the trainable transceiver 10. Statistical information may include and/or be diagnostic information. For example, statistical information may be or include types, makes, models, and/or other identification information of the devices which the trainable transceiver 10 has been trained to control. Statistical information may also include information about the use of the trainable transceiver 10. For example, statistical information may include information such as how frequently activation signals are transmitted, how many user input devices (e.g., buttons) are assigned to send an activation signal to a device or, in other words, how many buttons does a user use, where the trainable transceiver 10 is used most often, and/or other information related to the use of the trainable transceiver 10.

In some embodiments, the control circuit 22 of the trainable transceiver 10 may generate or receive diagnostic information related to the trainable transceiver 10. For example, the control circuit 22 may read from memory information related to the trainable transceiver. Memory 24 may contain information such as what devices the trainable transceiver 10 is trained to control, the power levels of the trainable transceiver 10, and/or other information related to the trainable transceiver 10. The control circuit 22 may access this information and transmit it to the mobile communications device 16. In some embodiments, the control circuit 22 may format, process, or otherwise manipulate the diagnostic information prior to transmitting it to the mobile communications device 16. In other embodiments, the trainable transceiver 10 may include other transceivers such as a cellular transceiver. The trainable transceiver 10 may use a cellular transceiver or other transceiver to transmit diagnostic information to a service provider 170 (e.g., a call center). The call center may receive the diagnostic information directly from the trainable transceiver 10 (e.g., not through an intermediary device such as the mobile communications device 16).

In some embodiments, the trainable transceiver 10 may acquire diagnostic information related to the home electronics device 12, remote device, or other device. For example, the trainable transceiver 10 may be in two way communication with the home electronics device 12. The trainable transceiver 10 may receive diagnostic information from the home electronics device 12. The diagnostic information may then be transmitted to another device (e.g., the mobile communications device 16, service provider 170, etc.).

Upon receiving diagnostic information from the trainable transceiver 10, the mobile communications device 16 and/or an application running thereon may take further action. For example, the mobile communications device 16 and/or application may allow a user to adjust the transmission frequency of the transceiver circuit 26 of the trainable transceiver 10 for a particular device. For example, a user may be training the trainable transceiver 10 to control a particular garage door opener. The diagnostic information may indicate that the garage door opener is not receiving the activation signal (e.g., no confirmation signal, status information, the frequency a channel is transmitting at, and/or other information is being transmitted to the trainable transceiver 10 from the device). The mobile communications device 16 may provide the user with additional training information and/or steps. The mobile communications device 16 and/or application may receive a user input to adjust the transmission frequency up or down. The mobile communications device 16 may transmit this adjustment to the trainable transceiver 10. The trainable transceiver 10 may then configure the activation signal to be sent using the updated frequency. The trainable transceiver 10 may send a test transmission. The trainable transceiver 10 may also send updated diagnostic information to the mobile communication device 16. The mobile communications device 16 may prompt the user to adjust the frequency again and/or take another action if the trainable transceiver 10 is still not in communication with the device. If the trainable transceiver 10 and the device are communicating, the mobile communications device 16 and/or application may inform the user that the trainable transceiver 10 has been successfully trained.

Referring now to FIG. 4, in some embodiments, the mobile communications device 16 may transmit the diagnostic information to another device. For example, the mobile communications device 16 may use an internet connection to transmit the diagnostic information to a server run by the service provider 170. The service provider 170 may be a help line, call center, and/or other entity. The service provider 170 may contact a user to provide additional assistance in training the trainable transceiver 10 to control a device.

In other embodiments, the trainable transceiver 10 may communicate the diagnostic information to the service provider 170. For example, the trainable transceiver 10 may use a cellular transceiver included with the trainable transceiver 10 and/or accessible to the trainable transceiver 10 (e.g., included in the vehicle electronics system) to send the diagnostic information to the service provider 170. In some embodiments, the trainable transceiver 10 may perform other functions described above with respect to the mobile communications device 16. For example, the trainable transceiver 10 may display diagnostic information, allow a user to adjust the frequency of the activation signal, etc.

In further embodiments, the trainable transceiver 10 may transmit vehicle diagnostic information to the mobile communications device 16. As previously described, the trainable transceiver 10 may be in communication with a vehicle electronics system. This may allow the trainable transceiver 10 to receive, access, and/or otherwise acquire vehicle diagnostic information. Vehicle diagnostic information may include information such as sensor data (e.g., tire pressure sensor data, engine temperature sensor data, odometer data, anti-lock braking system sensor data, and/or other data from one or more vehicle sensors), location data (e.g., data from a GPS sensor, dead reckoning system, compass, and/or other device for determining the location, position, and/or heading of a vehicle), data from or related to an ECU, data from or related to an ECM (e.g., oil pressure, coolant temperature, transmission fluid temperature, etc.), data from or related to an on-board diagnostic system (e.g., an on-board diagnostic system using a protocol such as OBD-II), and/or other information generated by a vehicle, stored by a vehicle, and/or related to a vehicle. Upon accessing vehicle diagnostic information, the trainable transceiver 10 may transmit the vehicle diagnostic information to the mobile communications device 16 and/or service provider 170 using one or more of the techniques described herein. For example, the trainable transceiver 10 may communicate vehicle diagnostic information to the mobile communications device 16 using a Bluetooth protocol.

Referring now to FIG. 5, a flow chart illustrates an exemplary embodiment of a method for using diagnostic information with a trainable transceiver. The trainable transceiver may receive diagnostic information from a home electronics device, remote device, and/or other device (step 180). For example, this may include the status of the device. Alternatively or additionally, the trainable transceiver may generate diagnostic information based on information local to the trainable transceiver (step 182). For example, this may include the activation signal parameters being used to attempt to communicate with the device and/or being used to communicate with the device. In other embodiments, the trainable transceiver may generate additional diagnostic information based on the information received from the device.

The trainable transceiver may process the diagnostic information (step 184). For example, the control circuit of the trainable transceiver may organize, correlate diagnostic information from the device and from local memory, format, and/or otherwise manipulate the diagnostic information from one or more sources. Processing may also include formatting and/or generating a transmission to be sent (e.g., to the mobile communications device). The transmission may include information and/or instructions which may be executed by the mobile communications device. The trainable transceiver may transmit diagnostic information to a mobile electronics device (step 186). For example, the trainable transceiver may use one or more of the communication techniques described in reference to FIGS. 2A-3B.

The mobile communications device may transmit the diagnostic information to a service provider (step 188). In some embodiments, this transmission may be caused by instructions received from the trainable transceiver. The mobile communications device may execute the instructions which cause the mobile communications device to transmit the diagnostic information to a service provider and/or other destination.

Alternatively or additionally, the trainable transceiver may receive instructions and/or information from the mobile communications device in response to the transmitted diagnostic information (step 190). For example, the mobile communications device may transmit an instruction to the trainable transceiver which, when executed, causes the trainable transceiver to adjust one or more activation signal parameters with respect to the device for which the trainable transceiver is being trained to control. In some embodiments, the instructions and/or information are generated by the mobile communications device. The instructions and/or information may be generated in response to and/or by an application running on the mobile communications device and/or by user input received by the mobile communications device. For example, the application may cycle through a plurality of frequencies for which the trainable transceiver may use to establish communication with a device. In response to the diagnostic information, the application may automatically select a new frequency (e.g., go through a list of possible frequencies one at a time) and send an instruction to the mobile communications device to try the new frequency. Alternatively, a user may provide an input which is used to generate an instruction and/or information to be sent to the trainable transceiver. For example, the user may select a particular frequency and/or other activation parameter to be used by the trainable transceiver. In some embodiments, the information and/or instructions are based in whole or in part on information received from the service provider. For example, the communication between the mobile communications device and the service provider may be bidirectional. In response to diagnostic information received from the mobile communications device, the service provider may send information and/or instructions to the mobile communication device. Based on the received information and/or instructions, the mobile communication device may send information and/or instructions to the trainable transceiver.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A trainable transceiver for controlling a remote device, comprising:

a transceiver circuit configured based on training information to communicate with the remote device;

a communications device configured to communicate with a mobile communications device; and a control circuit coupled to the transceiver circuit, and coupled to the communications device, wherein the control circuit is configured to:

transmit diagnostic information related to the trainable transceiver to a mobile communications device via the communications device, receive a signal generated based on the diagnostic information from the mobile communications device, and adjust a frequency used by the transceiver circuit to communicate with the remote device based on the received signal.

2. The apparatus of claim 1, wherein the diagnostic information related to the trainable transceiver includes at least one of an identifier of the remote devices for which the trainable transceiver is trained to control, power levels, and a status of the remote devices.

3. The apparatus of claim 1, wherein the diagnostic information includes statistical information related to the trainable transceiver including at least one of identification information of the devices which the trainable transceiver has been trained to control, a frequency with which activation signals are transmitted by the transceiver circuit, a number of user input devices assigned to send an activation signal, or a location at which the trainable transceiver is used most often.

4. The apparatus of claim 1, wherein the mobile communications device is configured to transmit the diagnostic information to a service provider.

5. The apparatus of claim 1, wherein the signal from the mobile communications device is based on information received by the mobile communications device from the service provider.

6. The apparatus of claim 1, wherein the communications device includes a radio frequency transceiver, and wherein the control circuit is configured to be in wireless communication with the mobile communications device via the radio frequency transceiver.

7. The apparatus of claim 1, wherein the communications device includes a microphone, and wherein the control circuit is configured to receive an audio transmission from the mobile communications device using the microphone.

8. The apparatus of claim 1, wherein the communications device includes a light sensor, and wherein the control circuit is configured to receive a light transmission from the mobile communications device using the light sensor.

9. A system for providing diagnostic information from a trainable transceiver for controlling a remote device, comprising:

(a) a trainable transceiver comprising:

a transceiver circuit configured based on training information to communicate with the remote device;

a first radio frequency transceiver;

and a control circuit coupled to the transceiver circuit and coupled to the radio frequency transceiver, wherein the control circuit is configured to receive or generate the diagnostic information, and wherein the control circuit is configured to transmit the diagnostic related to the trainable transceiver via the first radio frequency transceiver, and (b) a mobile communications device comprising:

a second radio frequency transceiver configured to receive a transmission from the first radio frequency transceiver including the diagnostic information;

a cellular transceiver; and a processing circuit coupled to the second radio frequency transceiver and coupled to the cellular transceiver, wherein the processing circuit is configured to transmit the diagnostic information related to the trainable transceiver to a service provider via the cellular transceiver and to transmit a signal based on the diagnostic information related to the trainable transceiver;

wherein the control circuit of the trainable transceiver is configured to adjust a frequency used by the transceiver circuit to communicate with the remote device based on the signal received from the mobile communications device.

10. The apparatus of claim 9, wherein the control circuit receives the diagnostic information from the remote device via a transmission sent from the remote device and received by the transceiver circuit.

11. The apparatus of claim 9, wherein the control circuit receives the diagnostic information from a vehicle electronics system and wherein the control circuit is coupled to the vehicle electronics system.

12. The apparatus of claim 9, wherein the diagnostic information includes at least one of information related to the trainable transceiver, statistical information related to the trainable transceiver, information related to the remote device, or vehicle diagnostic information.

13. A system for providing diagnostic information from a trainable transceiver for controlling a remote device, comprising:

(a) a vehicle electronics system comprising:

an electronics control unit; and a cellular transceiver wherein the electronics control unit is configured to control the cellular transceiver;

(b) a trainable transceiver comprising:

a transceiver circuit configured based on training information related to the trainable transceiver to communicate with the remote device; and a control circuit coupled to the transceiver circuit and coupled to the vehicle electronics system;

wherein the control circuit is configured to transmit diagnostic information related to the trainable transceiver to a service provider via the cellular transceiver of the vehicle electronics system and to adjust a frequency used by the transceiver circuit to communicate with the remote device based on a signal generated by the service provider based on the diagnostic information.

14. The apparatus of claim 13, wherein the control circuit is coupled to the vehicle electronics system by a vehicle electronics system interface.

15. The apparatus of claim 13, wherein the control circuit is included within the electronics control unit.

16. The apparatus claim 13, wherein the diagnostic information includes at least one of information related to the trainable transceiver, statistical information related to the trainable transceiver, information related to the remote device, or vehicle diagnostic information.

* * * * *